United States Patent
Shen et al.

(10) Patent No.: US 9,366,892 B2
(45) Date of Patent: Jun. 14, 2016

(54) TOUCH DISPLAY DEVICE

(71) Applicant: ASIA VITAL COMPONENTS CO., LTD., Sinjhuang District, New Taipei (TW)

(72) Inventors: Ching-Hang Shen, New Taipei (TW); Fu-Kuei Chang, New Taipei (TW)

(73) Assignee: Asia Vital Components Co., Ltd., New Taipei (TW)

(*) Notice: Subject to any disclaimer, the term of this patent is extended or adjusted under 35 U.S.C. 154(b) by 42 days.

(21) Appl. No.: 13/747,397

(22) Filed: Jan. 22, 2013

(65) Prior Publication Data

US 2014/0204282 A1   Jul. 24, 2014

(51) Int. Cl.
*G02F 1/1335* (2006.01)
*G02F 1/1333* (2006.01)
*G06F 1/16* (2006.01)
*G02F 1/1345* (2006.01)
*G06F 3/041* (2006.01)

(52) U.S. Cl.
CPC ........ *G02F 1/133308* (2013.01); *G02F 1/1345* (2013.01); *G02F 1/13338* (2013.01); *G02F 1/13452* (2013.01); *G06F 1/1643* (2013.01); *G06F 3/0416* (2013.01)

(58) Field of Classification Search
CPC . G02F 1/13452; G02F 1/1345; G06F 3/0416; G06F 1/1643
USPC .................................................. 349/149–152
See application file for complete search history.

(56) References Cited

U.S. PATENT DOCUMENTS

| 2004/0080678 A1* | 4/2004 | Oh et al. ........................ 349/12 |
| 2008/0062148 A1* | 3/2008 | Hotelling et al. ............. 345/174 |

FOREIGN PATENT DOCUMENTS

| CN | 101763148 B | 6/2010 |
| TW | M443228 U | 12/2012 |

* cited by examiner

*Primary Examiner* — Phu Vu
(74) *Attorney, Agent, or Firm* — C. G. Mersereau; Nikolai & Mersereau, P.A.

(57) ABSTRACT

A touch display device includes a case, a liquid crystal display unit and a frame body. The case has a receiving space. The liquid crystal display unit is disposed in the receiving space of the case. The liquid crystal display unit has a display surface. At least one printed circuit layer is disposed on the display surface. Multiple transmitters and multiple receivers are electrically connected on the printed circuit layer. The frame body is mounted on the case to cover the printed circuit layer. The printed circuit layer is directly formed on the display surface of the liquid crystal display unit so that the cost for the circuit boards is saved. In this case, the manufacturing cost of the touch display device is lowered. Moreover, the total thickness of the touch display device is reduced and the installation is facilitated.

6 Claims, 6 Drawing Sheets

TOUCH DISPLAY DEVICE

BACKGROUND OF THE INVENTION

1. Field of the Invention

The present invention relates generally to a touch display device, and more particularly to a touch display device, in which printed circuit layer is coated on the display surface of the liquid crystal display unit so that the cost for the circuit boards is saved. Furthermore, the displacement of the touch point can be avoided to maintain the touch precision.

2. Description of the Related Art

Along with the continuous advance of sciences and technologies, there is a trend in the commercially available electronic products to have smaller and smaller volume, while larger and larger screen. Such electronic product generally is free from any operation pushbutton and has a touch screen for a user to directly operate the electronic product.

Infrared touch control technique is the most popular technique for the existent large-size touch screens. The infrared touch screen basically includes a touch substrate and multiple transmitters and multiple receivers mounted on a periphery of the touch substrate in a certain sequence. The transmitters and receivers are one-to-one correspondingly arranged to form a tidily interlaced infrared ray network. That is, a perpendicular transmission/receiving array is formed along the periphery of the touch substrate. Under the control of a processor, the corresponding transmitters and receivers are respectively connected in a certain sequence to detect whether the infrared rays between the corresponding transmitters and receivers are interrupted so as to judge whether a touch takes place.

Please refer to FIG. 1. The conventional touch panel detection device 1 includes a frame 10 and multiple circuit boards 11 fixedly disposed on an inner side of the frame 10. Multiple transmitters 111, multiple receivers 112 and multiple electronic components 113 are arranged on the circuit boards 11. The transmitters 111 and receivers 112 are such arranged as to form an infrared touch matrix. The circuit boards 11 are positioned on a liquid crystal display unit 12 enclosed in a case 13. Under the control of the electronic components 113, the corresponding transmitters 111 and receivers 112 are respectively connected in a certain sequence to detect whether the infrared rays between the corresponding transmitters 111 and receivers 112 are interrupted so as to judge whether a touch takes place. Multiple circuit boards 11 are arranged on the frame 10 and electrically connected with each other. The cost for the circuit boards 11 is quite high so that the manufacturing cost of the touch panel is increased. Moreover, the circuit boards 11 cause increase of thickness of the touch panel and inconvenience in installation.

Furthermore, it is uneasy to locate the circuit boards 11 on the liquid crystal display unit 12. The circuit boards 11 are fixed with the frame. When moving the screen, the liquid crystal display unit 12 tends to displace within the case 13. In this case, the touch position detected by the transmitters 111 and receivers 112 is likely to displace from the picture displayed on the liquid crystal display unit 12. As a result, the touch point is displaced and the touch precision is deteriorated.

According to the above, the conventional technique has the following shortcomings:

1. The cost for the circuit boards is quite high so that the manufacturing cost of the touch panel is increased.
2. The circuit boards cause increase of thickness of the touch panel.
3. The circuit boards cause inconvenience in installation.
4. The touch precision is deteriorated.

SUMMARY OF THE INVENTION

It is therefore a primary object of the present invention to provide a touch display device, in which printed circuit layer is directly coated on the display surface of the liquid crystal display unit so that the cost for the circuit boards is saved.

It is a further object of the present invention to provide the above touch display device, in which the total thickness of the touch display device is reduced and the installation is facilitated.

It is still a further object of the present invention to provide the above touch display device, in which the displacement of the touch point can be avoided to maintain the touch precision.

To achieve the above and other objects, the touch display device of the present invention includes a case, a liquid crystal display unit and a frame body. The case has a receiving space in which the liquid crystal display unit is disposed. The liquid crystal display unit has a display surface. At least one printed circuit layer is disposed on the display surface. Multiple transmitters and multiple receivers are electrically connected on the printed circuit layer. The frame body is mounted on the case to cover the printed circuit layer.

The printed circuit layer is directly formed on the display surface of the liquid crystal display unit so that the cost for the circuit boards is saved. In this case, the manufacturing cost of the touch display device is lowered. Moreover, the total thickness of the touch display device is reduced and the installation is facilitated. Furthermore, the displacement of the touch point can be avoided to maintain the touch precision.

In comparison with the conventional technique, the present invention has the following advantages:

1. The printed circuit layer is directly formed on the display surface of the liquid crystal display unit so that the cost for the circuit boards is saved. In this case, the manufacturing cost of the touch display device is lowered.
2. The total thickness of the touch display device is reduced.
3. The installation is facilitated.
4. The displacement of the touch point is avoided so that the touch precision is maintained.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
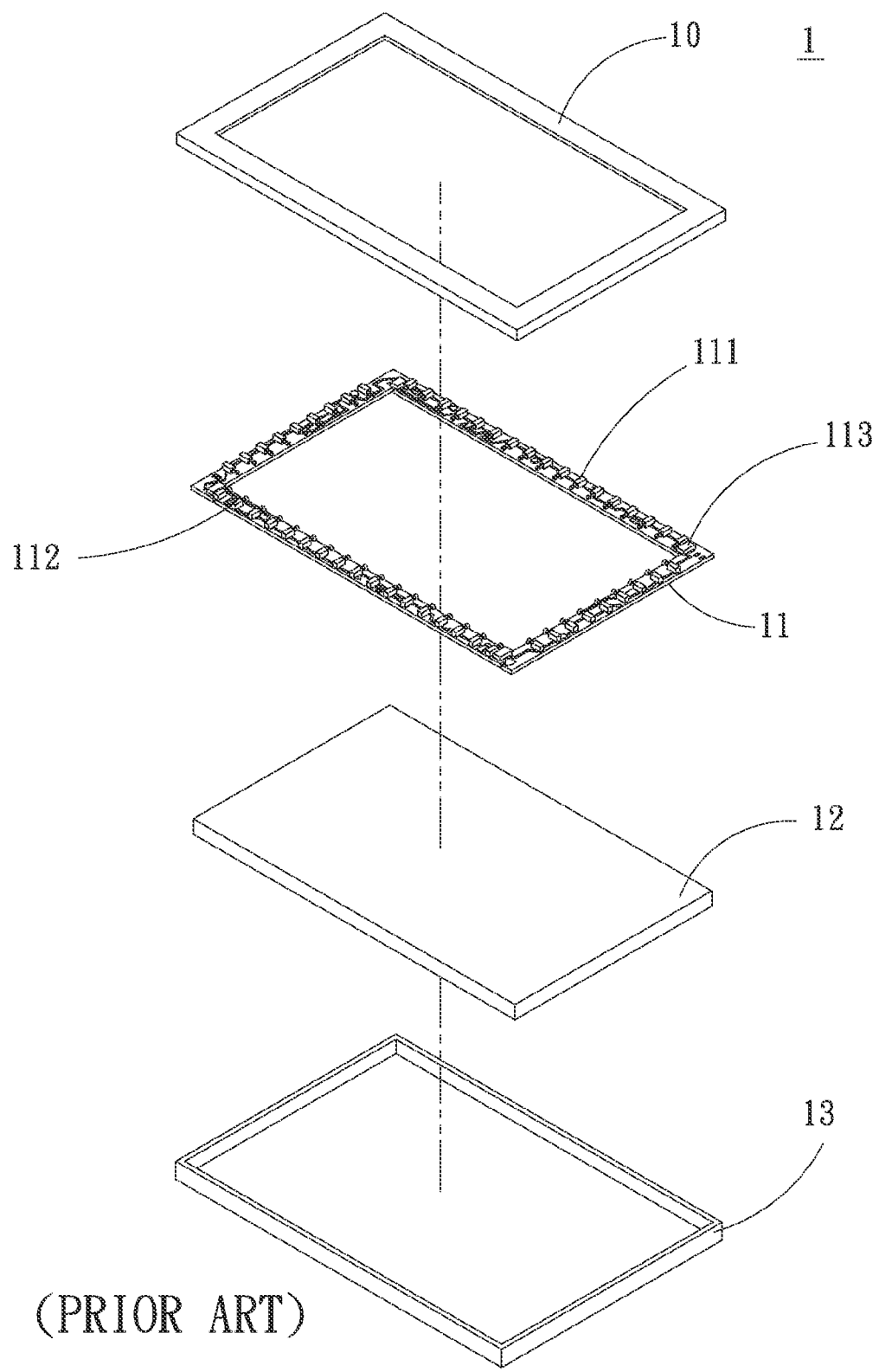
FIG. 1 is a perspective exploded view of a conventional touch panel detection device.
Figure 2:
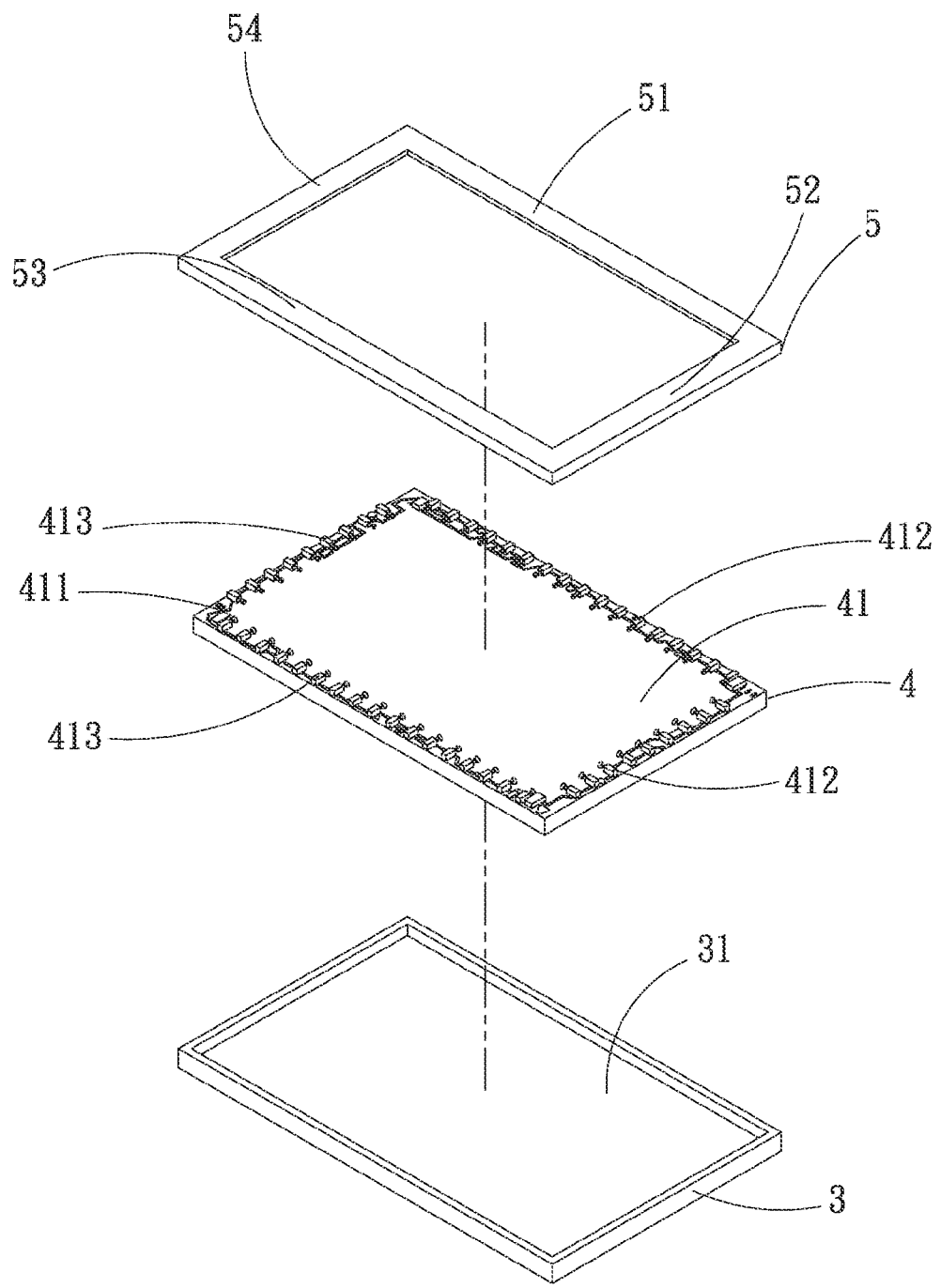
FIG. 2 is a perspective exploded view of a first embodiment of the present invention.
Figure 3:
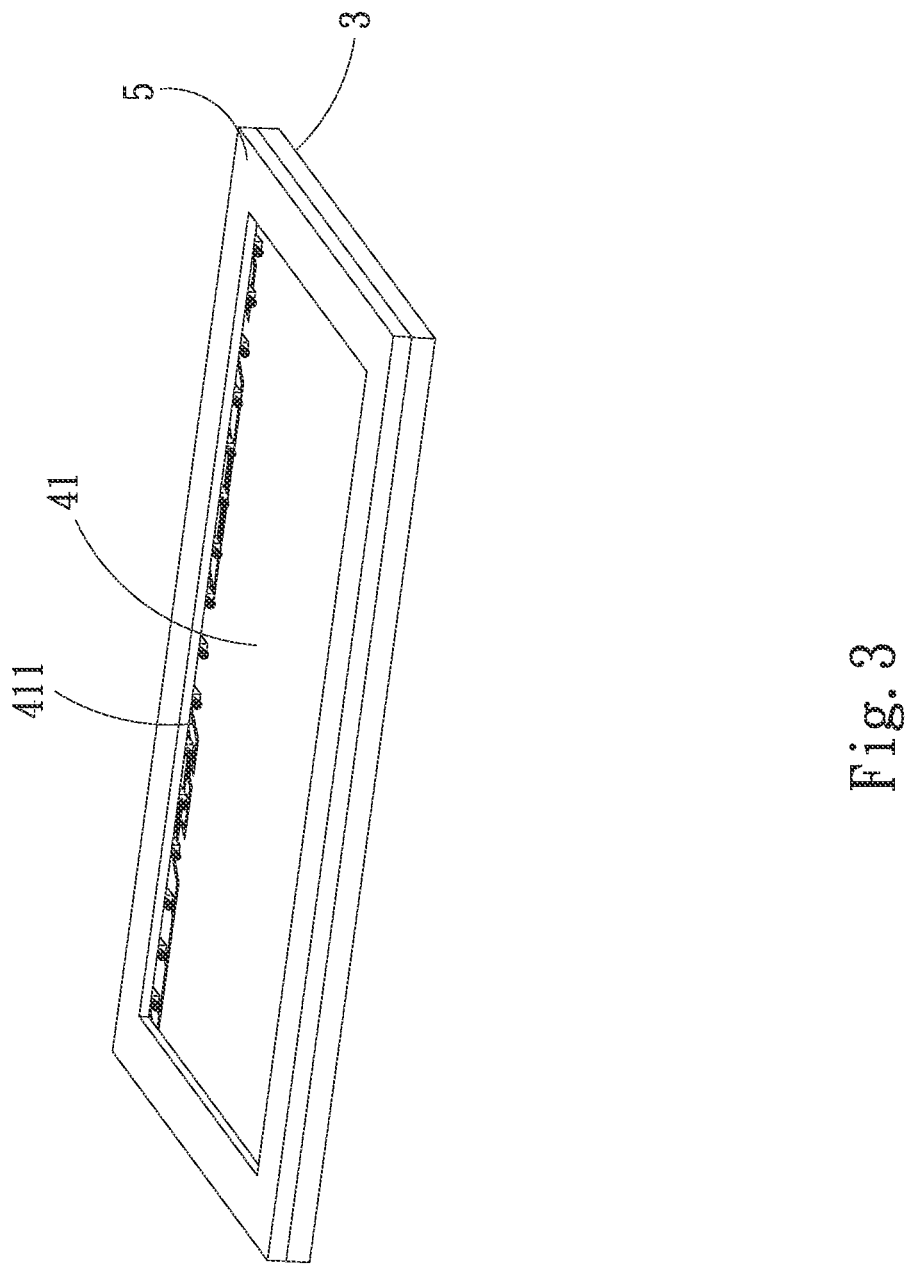
FIG. 3 is a perspective assembled view of the first embodiment of the present invention.
Figure 4:
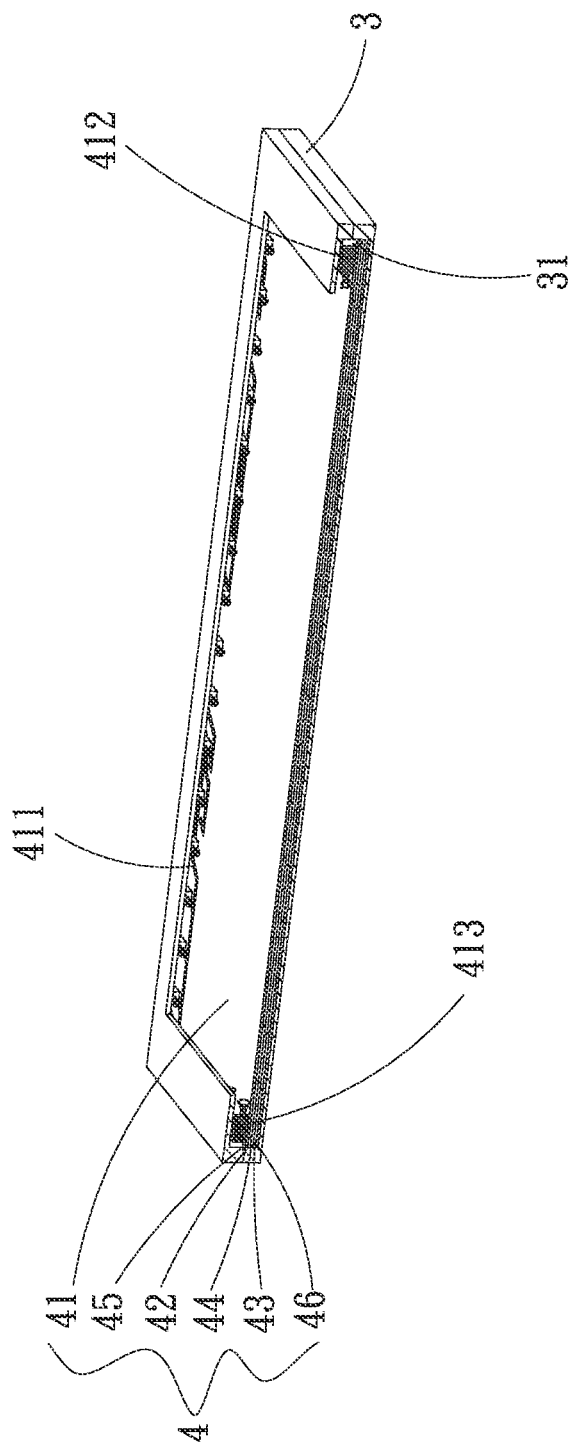
FIG. 4 is a sectional view of the first embodiment of the present invention.

Please refer to FIGS. 2, 3 and 4. FIG. 2 is a perspective exploded view of a first embodiment of the present invention.

FIG. 3 is a perspective assembled view of the first embodiment of the present invention. FIG. 4 is a sectional view of the first embodiment of the present invention. According to the first embodiment, the touch display device 2 of the present invention includes a case 3, a liquid crystal display unit 4 and a frame body 5.

The case 3 has a receiving space 31 in which the liquid crystal display unit 4 is disposed.

The liquid crystal display unit 4 has a display surface 41. Also, the liquid crystal display unit 4 has a first substrate 42, a second substrate 43 and a liquid crystal layer 44 sandwiched between the first and second substrates 42, 43. A first polarizer 45 is disposed on the other side of the first substrate 42, which side is distal from the liquid crystal layer 44. A second polarizer 46 is disposed on the other side of the second substrate 43, which side is distal from the liquid crystal layer 44. The other side of the first polarizer 45, which side is distal from the first substrate 42 serves as the display surface 41.

At least one printed circuit layer 411 is disposed on the display surface 41. The printed circuit layer 411 is formed on the display surface 41 by means of printing, scattering deposition or mask. In this embodiment, the printed circuit layer 411 is disposed on a periphery of the display surface 41. Multiple transmitters 412 and multiple receivers 413 are electrically connected on the printed circuit layer 411. In this embodiment, the transmitters 412 and receivers 413 are infrared transmitters 412 and infrared receivers 413.

The frame body 5 is composed of a first frame 51, a second frame 52, a third frame 53 and a fourth frame 54. The first and third frames 51, 53 are disposed on two sides of the frame body 5 opposite to each other. The second and fourth frames 52, 54 are disposed on two other sides of the frame body 5 opposite to each other. The frame body 5 is mounted on the case 3 with the first, second, third and fourth frames covering the periphery of the display surface 41 so as to cover the printed circuit layer 411.

In this embodiment, the transmitters 412 are disposed on the display surface 41 corresponding to the first and second frames 51, 52, while the receivers 413 are disposed on the display surface 41 corresponding to the third and fourth frames 53, 54. Alternatively, the transmitters 412 are disposed on the display surface 41 corresponding to the third and fourth frames 53, 54, while the receivers 413 are disposed on the display surface 41 corresponding to the first and second frames 51, 52.

In this embodiment, the transmitters 412 disposed on the display surface 41 corresponding to the first frame 51 and the receivers 413 are disposed on the display surface 41 corresponding to the third frame 53 are horizontally arranged opposite to each. Also, the transmitters 412 disposed on the display surface 41 corresponding to the second frame 52 and the receivers 413 are disposed on the display surface 41 corresponding to the fourth frame 54 are horizontally arranged opposite to each other. In addition, the transmitters 412 disposed on the display surface 41 corresponding to the first frame 51 are normal to the first frame 51 and the receivers 413 disposed on the display surface 41 corresponding to the third frame 53 are normal to the third frame 53 and aligned with the transmitters 412. The transmitters 412 disposed on the display surface 41 corresponding to the second frame 52 are normal to the second frame 52 and the receivers 413 disposed on the display surface 41 corresponding to the fourth frame 54 are normal to the fourth frame 54 and aligned with the transmitters 412.

According to the above structural design, the printed circuit layer 411 is directly formed on the display surface 41 of the liquid crystal display unit 4 so that the cost for the circuit boards is saved. In this case, the manufacturing cost of the touch display device 2 is lowered. Moreover, the total thickness of the touch detection structure is reduced and the installation is facilitated. Furthermore, the displacement of the touch point can be avoided to maintain the touch precision.

Figure 5:
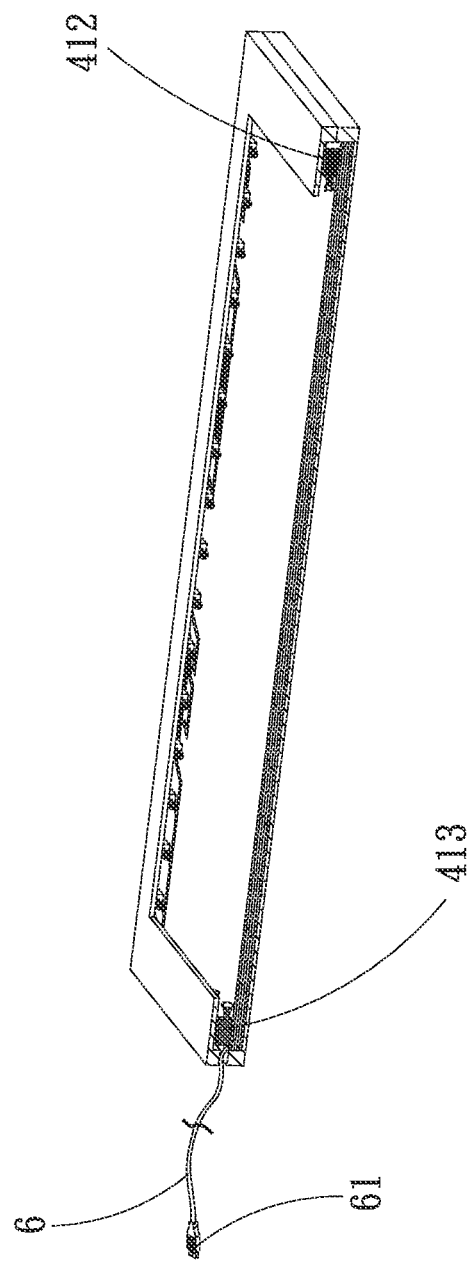
FIG. 5 is a sectional view showing the application of the first embodiment of the touch display device of the present invention.

Please now refer to FIG. 5, which is a sectional view showing the application of the first embodiment of the touch display device of the present invention. The touch display device 2 further includes a connection line 6 electrically connected with the printed circuit layer 411 and the transmitters 412 and the receivers 413. The connection line 6 has a plug 61. The plug 61 can be a USB connector, a 1394 connector, an HDMI connector or Bluetooth connector.

Figure 6:
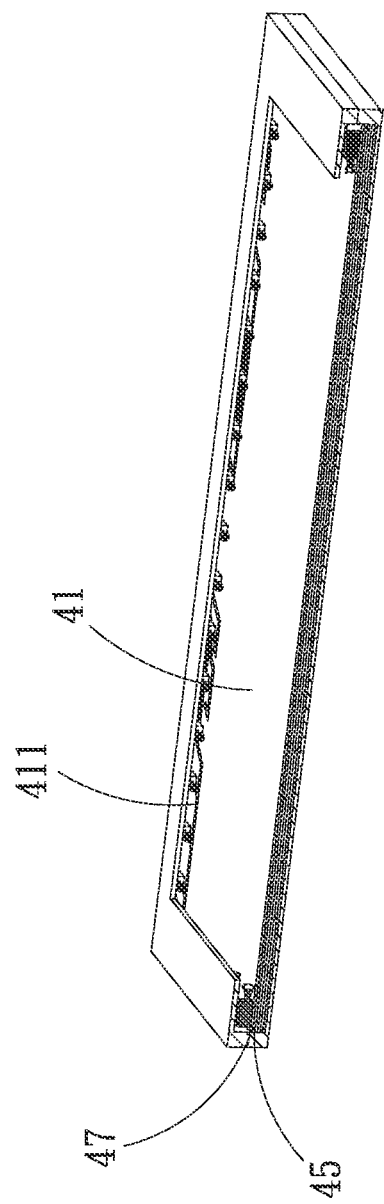
FIG. 6 is a sectional view of a second embodiment of the present invention.

Please now refer to FIG. 6, which is a sectional view of a second embodiment of the present invention. The second embodiment is partially identical to the first embodiment and thus will not be repeatedly described hereinafter. The second embodiment is different from the first embodiment in that a protection glass layer 47 is disposed on the other side of the first polarizer 45, which side is distal from the first substrate 42. The other side of the protection glass layer 47, which side is distal from the first polarizer 45 serves as the display surface 41. The printed circuit layer 411 is disposed on the display surface 41. The printed circuit layer 411 is formed on the display surface 41 by means of printing, scattering deposition or mask. According to the above structural design, the printed circuit layer 411 is directly formed on the display surface 41 of the liquid crystal display unit 4 (as shown in FIG. 4) so that the cost for the circuit boards is saved. In this case, the manufacturing cost of the touch display device 2 is lowered. Moreover, the total thickness of the touch detection structure is reduced and the installation is facilitated. Furthermore, the displacement of the touch point can be avoided to maintain the touch precision.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch display device comprising:
   a case having a receiving space;
   a liquid crystal display unit disposed in the receiving space of the case, the liquid crystal display unit having a display surface with a single printed circuit layer directly coated on the display surface of the liquid crystal display unit, multiple transmitters and multiple receivers being electrically connected on the printed circuit layer; and
   a frame body without a circuit board mounted on the case to cover the printed circuit layer, a total thickness of the touch display device being reduced.

2. The touch display device as claimed in claim 1, wherein the liquid crystal display unit has a first substrate, a second substrate and a liquid crystal layer sandwiched between the first and second substrates, a first polarizer being disposed on the other side of the first substrate, which side is distal from the liquid crystal layer, a second polarizer being disposed on the other side of the second substrate, which side is distal from the liquid crystal layer, the other side of the first polarizer, which side is distal from the first substrate serving as the display surface.

3. The touch display device as claimed in claim 2, wherein a protection glass layer is disposed on the other side of the first polarizer, which side is distal from the first substrate, the other side of the protection glass layer, which side is distal from the first polarizer serving as the display surface.

4. The touch display device as claimed in claim 1, wherein the printed circuit layer is directly coated on a periphery of the display surface of the liquid crystal display and the frame body is mounted on the case to cover the periphery of the display surface so as to cover the printed circuit layer.

5. The touch display device as claimed in claim 1, further comprising a connection line electrically connected with the printed circuit layer and the transmitters and the receivers, the connection line having a plug, the plug being selected from a group consisting of USB connector, 1394 connector, HDMI connector and Bluetooth connector.

6. The touch display device as claimed in claim 1, wherein the transmitters and the receivers are infrared transmitters and infrared receivers.

* * * * *